United States Patent
Enkerlin et al.

(10) Patent No.: US 9,267,642 B2
(45) Date of Patent: Feb. 23, 2016

(54) CASE WITH INTEGRATED SWIVEL HAND-STRAP AND PULLOUT STAND SYSTEM

(75) Inventors: Mike Enkerlin, Poway, CA (US); Leonard Wesson, Fountain Valley, CA (US)

(73) Assignee: THE JOY FACTORY, INC., Irvine, CA (US)

( * ) Notice: Subject to any disclaimer, the term of this patent is extended or adjusted under 35 U.S.C. 154(b) by 0 days.

(21) Appl. No.: 13/996,282

(22) PCT Filed: May 25, 2011

(86) PCT No.: PCT/US2011/037934
§ 371 (c)(1),
(2), (4) Date: Feb. 20, 2014

(87) PCT Pub. No.: WO2012/087371
PCT Pub. Date: Jun. 28, 2012

(65) Prior Publication Data
US 2014/0167431 A1   Jun. 19, 2014

Related U.S. Application Data

(60) Provisional application No. 61/426,498, filed on Dec. 22, 2010.

(51) Int. Cl.
*A45F 5/00* (2006.01)
*F16M 13/06* (2006.01)
*F16M 11/10* (2006.01)
*F16M 13/00* (2006.01)
*F16M 13/04* (2006.01)

(52) U.S. Cl.
CPC .............. *F16M 13/06* (2013.01); *F16M 11/10* (2013.01); *F16M 11/105* (2013.01); *F16M 13/00* (2013.01); *F16M 13/04* (2013.01)

(58) Field of Classification Search
CPC ..... F16M 13/06; F16M 11/10; F16M 11/105; F16M 13/00; F16M 13/04
USPC ............ 294/142, 25, 137, 139, 150; 224/217, 224/218, 930; 206/320; 361/679.3, 679.55, 361/679.03, 679.56; 455/575.8; 248/682, 248/444, 450
See application file for complete search history.

(56) References Cited

U.S. PATENT DOCUMENTS

| | | | |
|---|---|---|---|
| 4,984,760 A | 1/1991 | Cohn | |
| 8,282,060 B2 * | 10/2012 | Fan | 248/291.1 |
| 8,382,059 B2 * | 2/2013 | Le Gette et al. | 248/460 |
| 8,690,210 B1 * | 4/2014 | May | 294/25 |
| 8,740,270 B1 * | 6/2014 | Mizell et al. | 294/25 |
| 2009/0036174 A1 * | 2/2009 | Brandenburg et al. | 455/575.1 |
| 2009/0219677 A1 * | 9/2009 | Mori et al. | 361/679.03 |
| 2011/0034221 A1 * | 2/2011 | Hung et al. | 455/575.8 |
| 2011/0279959 A1 * | 11/2011 | Lopez | 361/679.03 |
| 2012/0104059 A1 * | 5/2012 | Yen | 224/218 |
| 2012/0106054 A1 * | 5/2012 | Royz et al. | 361/679.3 |
| 2012/0181196 A1 * | 7/2012 | Mongan et al. | 206/320 |
| 2014/0049060 A1 * | 2/2014 | Rayner | 294/25 |

OTHER PUBLICATIONS

International Search Report from corresponding PCT application No. PCT/US2011/037934.

* cited by examiner

*Primary Examiner* — Gabriela Puig
(74) *Attorney, Agent, or Firm* — Hauptman Ham, LLP (57) ABSTRACT

A case for holding a mobile device. The case comprises a case defining an interior compartment for receiving the mobile device therein; a rotatable platform connected with the case; a hand-strap connected with the platform for being held by a user; and a pullout stand connected with the platform.

20 Claims, 11 Drawing Sheets

CASE WITH INTEGRATED SWIVEL HAND-STRAP AND PULLOUT STAND SYSTEM

RELATED APPLICATIONS

The present application is a US National Stage Application of International PCT Application Number PCT/US11/37934, filed May 25, 2011, which claims priority to U.S. Provisional Application No. 61/426,498, filed on Dec. 22, 2010, the disclosure of which is hereby incorporated by reference herein in its entirety.

BACKGROUND

Mobile devices exist which have a flat, relatively thin configuration. The thickness of the device is small in comparison to the length and width. Such devices may be referred to as tablet or slate-type devices due to the resemblance to their analogue, non-processor-based predecessors. One such device is the manufactured by Apple, Inc. of Cupertino, Calif.

These mobile devices are used for varying functionality in differing environments, e.g., the device may be used as a note-taker, a book reader, a personal life sharing device, a movie player, and general business functionalities such as e-mail, and document, spreadsheet, and presentation preparation. As a result of the broad range of uses to which such a mobile device may be put, users often need to hold the unit easily in their hands and also be able to position the device on a surface in order to display multimedia content.

DESCRIPTION OF THE DRAWINGS

One or more embodiments are illustrated by way of example, and not by limitation, in the figures of the accompanying drawings, wherein elements having the same reference numeral designations represent like elements throughout and wherein.

DETAILED DESCRIPTION

A mobile device case in accordance with one or more embodiments comprises a rotatable platform which incorporates a hand-strap and a pullout stand.

Figure 1:
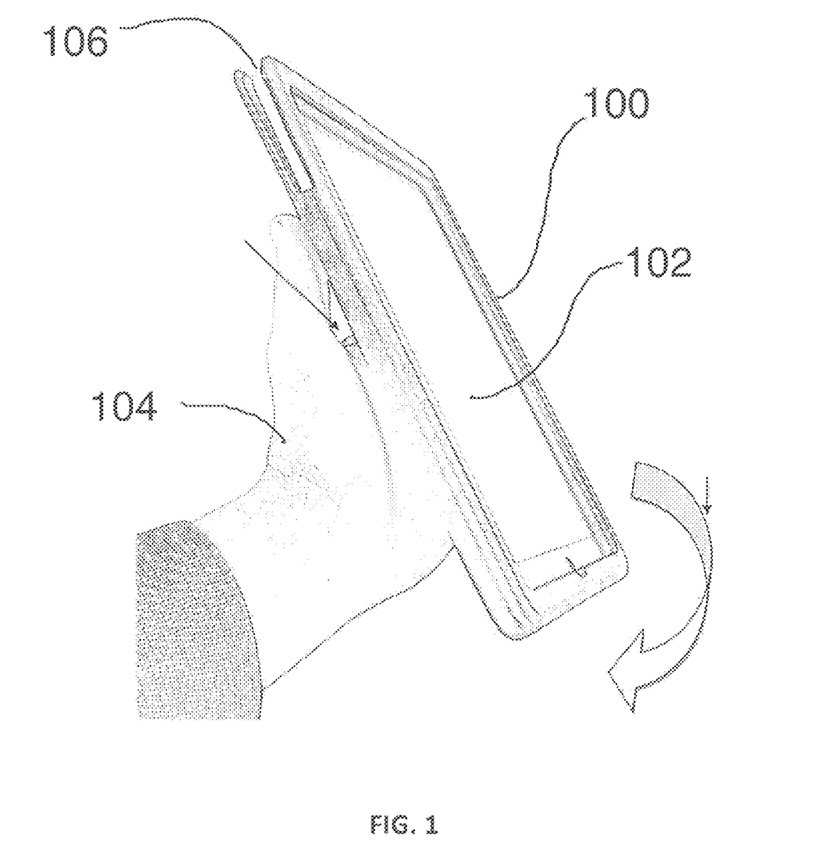
FIG. 1 is a perspective view of a case according to an embodiment.

FIG. 1 depicts a perspective view of a case 100 (also sometimes referred to as a sleeve) in use by a user. A mobile device 102 is retained within case 100. The user is holding the case with a hand 104 in a hand-strap behind the case. With the user's hand 104 in the hand-strap, case 100 is rotatable in a plane approximately perpendicular to the palm of the user's hand. In at least some embodiments, case 100 is rotatable 360° with respect to the user's hand 104 in the hand-strap.

Case 100 also defines a slot opening 106 along at least one edge of the case for receiving mobile device 102 into the interior of the case. Slot opening 106 extends along the entirety of one edge of case 100 and partially along each connected edge. In at least some embodiments, slot opening 106 is limited to a single edge of case 100. In at least some embodiments, case 100 does not define a slot opening along an edge and instead is hinged at one end to enable insertion of mobile device 102.

Figure 2:
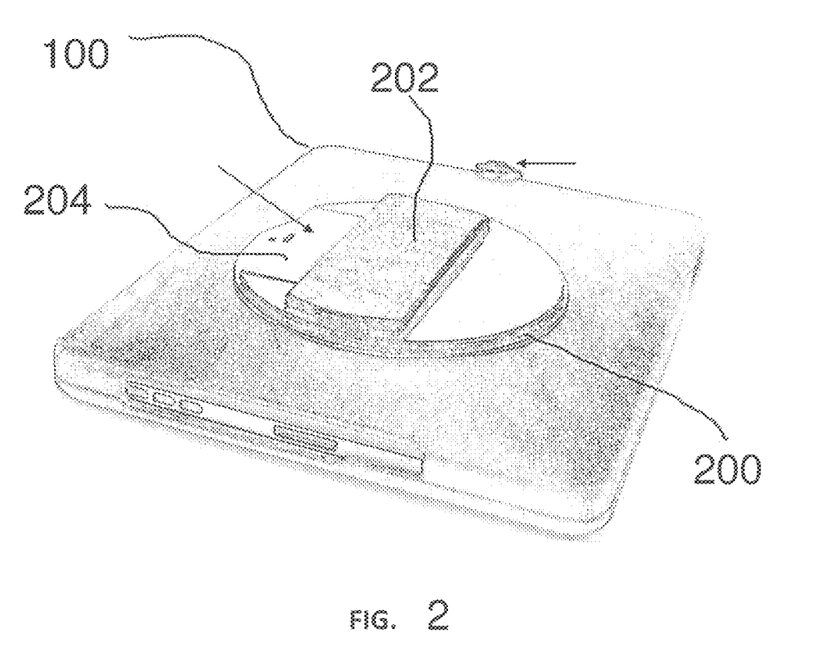
FIG. 2 is a rear perspective view of the case of FIG. 1.

FIG. 2 depicts a rear perspective view of case 100 in which rotatable platform 200 is visible. Platform 200 comprises a hand-strap 202 and pullout stand 204. In at least some embodiments, hand-strap 202 and/or pullout stand 204 are integral parts of platform 200.

Hand-strap 202 is a flexible component and arranged to extend away from the rear surface of case 100 in order to enable a user to slide hand 104 within the strap. In at least some embodiments, platform 200 and case 100 are rotatable with respect to each other to at least 360°. In at least some embodiments, platform 200 and case 100 may be limited in terms of the degree to which they are rotatable with respect to each other. In at least some other embodiments, platform 200 and case 100 may be rotated with respect to each other less than 360°.

Figure 3:
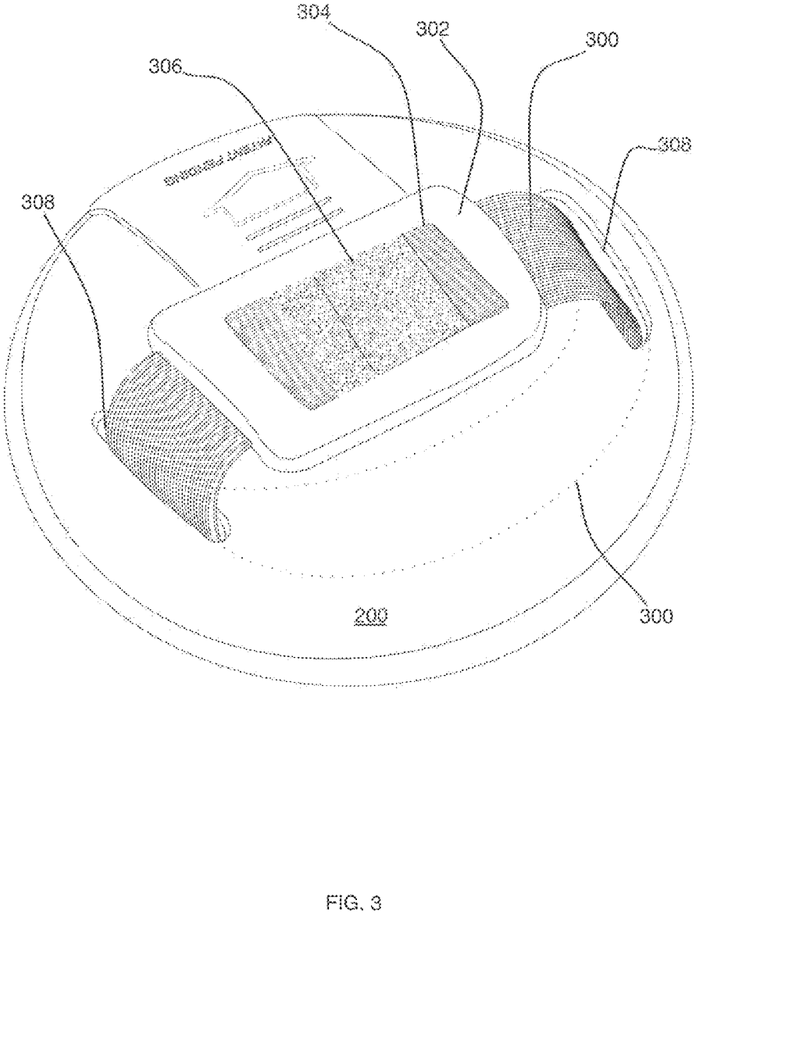
FIG. 3 is a view of a hand-strap connected to a platform according to an embodiment.

FIG. 3 is a view of hand-strap 202 connected to platform 200 in an extended position in which an opening is created for receiving a user's hand 104. Hand-strap 202 comprises a resilient, stretchable strap 300 which connects a flexible handle 302 to platform 200.

Flexible handle 302 is a rectangular parallelepiped with a smooth face facing the face of platform 200. Flexible handle 302 defines a central open area 304 for receipt of the ends of stretchable strap 300 and enables adjustment of the connection of the ends by a user. The ends of resilient strap 300 include hook and loop fasteners 306 or other connecting mechanisms to enable an adjustable connection to each other.

In at least some embodiments, flexible handle 302 is omitted and strap 300 receives hand 104. In at least some other embodiments, stretchable strap 300 is a single unitary loop of material.

Resilient strap 300 extends through a pair of openings 308 in the face of platform 200 to enable the ends of the strap to connect to each other within handle 302. In at least some embodiments, the ends of strap 300 connect to each other outside of handle 302. In at least some embodiments, the pair of openings 308 are positioned on opposite edges of the periphery of platform 200. In at least some other embodiments, only a single opening 308 is used.

Resilient strap 300 extends around two faces of platform 200 all passing through openings 308. Because openings 308 are spaced apart and toward the outer edge of the circumference of platform 200, a twisting or rotational motion imparted by hand 104 to resilient strap 300 is able to cause rotation of the platform.

Figure 4:
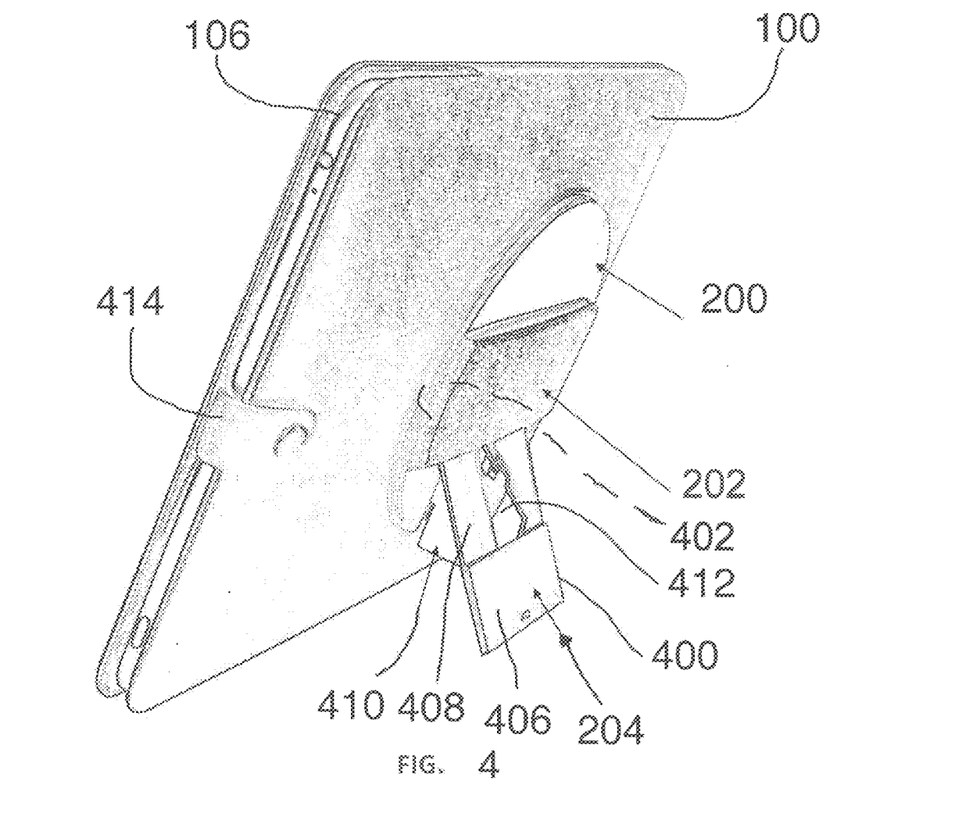
FIG. 4 is a rear perspective view of a case according to an embodiment with a pullout stand in an extended position.

FIG. 4 is a rear perspective view of case 100 with pullout stand 204 in an extended or "pulled out" position. Stand 204 is slidably connected to platform 200. Stand 204 comprises a first planar portion 400 hingedly connected with a second planar portion 402 (not visible in FIG. 4). A lower, outer edge of first planar portion 400 forms the base on which case 100 rests to hold a mobile device in an upright position for viewing. Although depicted as a generally rectangular shaped planar portion, first planar portion 400 may comprise any number of different shapes.

First planar portion 400 comprises a visible region 406 distal from case 100 and a connecting region 408 which connects visible region 406 to second planar portion 402. Visible region 406 has a greater thickness in comparison to connecting region 408. Because connecting region 408 is thinner than visible region 406, visible region 406 is prevented from sliding into platform 200 in a non-extended position.

Stand 204 also comprises a support leg 410 formed from a cutout region 412 of connecting region 408. Support leg 410 is flexibly and/or hingedly connected with connecting region 408. In at least some embodiments, support leg 410 is a separate element from connecting region 408 and sized to fit within cutout region 412.

In an extended position, at least a portion of support leg 410 interfits with platform 200 and holds stand 204 at an angle extending away from the platform. Based on the angle at which stand 204 extends from platform 200, case 100 forms a predetermined angle with respect to the surface on which case 100 rests. In at least some embodiments, the predetermined angle ranges from about sixty-five degrees (65°) to about seventy-five degrees (75°). In at least one embodiment, the predetermined angle is seventy degrees (70°). In at least some embodiments, the angle at which case 100 positions mobile device 102 for viewing by a user depends at least in part on the predetermined angle and the length of stand 204.

In a non-extended position with support leg 410 generally coplanar with connecting region 408, the rear portion of case 100 is more flat than having a permanently affixed and positioned stand attached to the rear of the case.

Also visible in FIG. 4 is a snap closure 414 positioned to close over slot opening 106 and secure mobile device 102 within case 100. In at least some embodiments, snap closure 414 comprises a hook and loop fastening closure mechanism. In other embodiments, other closure mechanisms can also be used including for example buckles, belt-like straps and magnetic latches.

Figure 5:
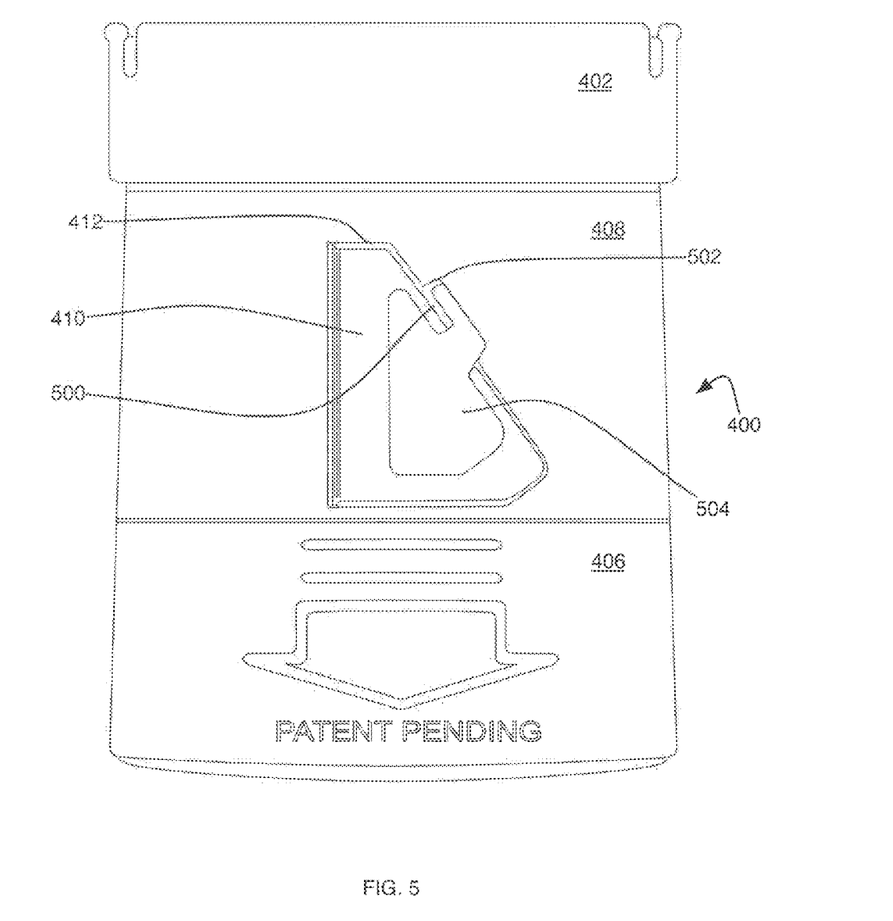
FIG. 5 is a detailed plan view of a pullout stand according to an embodiment.

FIG. 5 is a plan view of pullout stand 204. Second planar portion 402 is not visible outside of platform 200. Second planar portion 402 is wider than first planar portion 400 in order to secure the second portion within a defined opening of platform 200. When installed inside platform 200, second planar portion 402 extends substantially entirely within the rotatable platform.

Cutout region 412 and support leg 410 positioned within the region are visible in connecting portion 408. Support leg 410 also comprises a slit 500 formed in an insertable clip 502 and along an edge of the support leg not connected to connecting region 408. Insertable clip 502 is formed along the edge of support leg 410 directed to the face of rotatable platform 200. Slit 500 is sized to receive the thickness of platform 200 after clip 502 is inserted into a corresponding opening in platform 200.

In at least some embodiments, support leg 410 lacks insertable clip 502 and instead comprises a hardened clip 504, e.g., a metallic shape attached to or inserted in support leg 410, having slit 500 and insertable clip 502 formed therein.

Because pullout stand 204 is slidable with respect to platform 200, insertable clip 502 and slit 500 maybe slid more fully into contact with the platform and more effectively lock the pullout stand into position. Even with pullout stand 204 extended and locked into position by the insertion of clip 502 into the platform, the platform remains rotatable. In at least some embodiments, the user of the case is provided the flexibility to use the same pulled out stand and move it to a desired position without having to close and open other support pieces/brackets.

Figure 6:
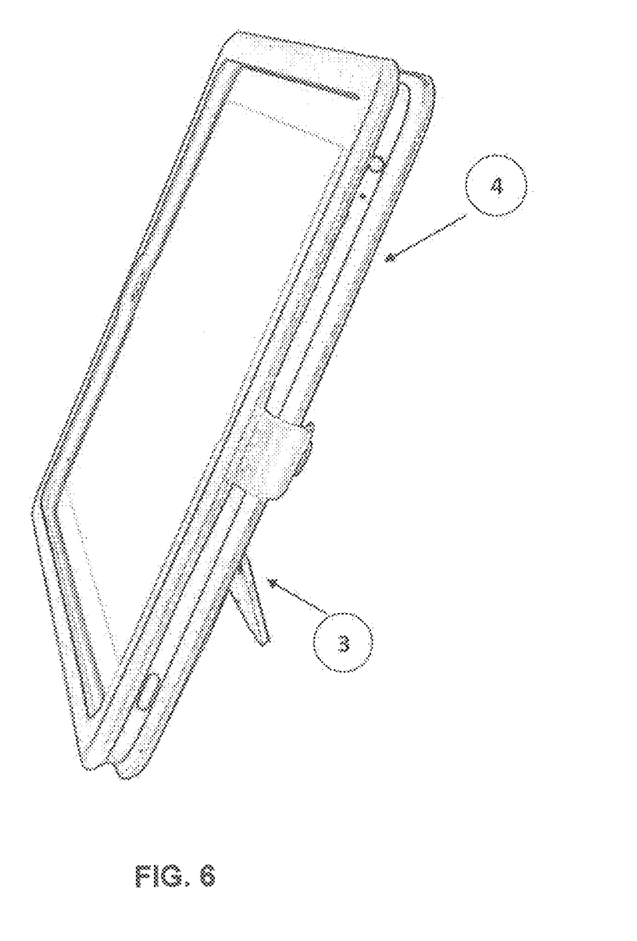
FIG. 6 is a perspective view of the case according to an embodiment.

FIG. 6 is a perspective view of case 100 holding a mobile device 102 and with pullout stand 204 in an extended position in order to display the mobile device at an angle. In FIG. 6, case 100 is in a landscape position wherein the length is greater than the height.

Figure 7:
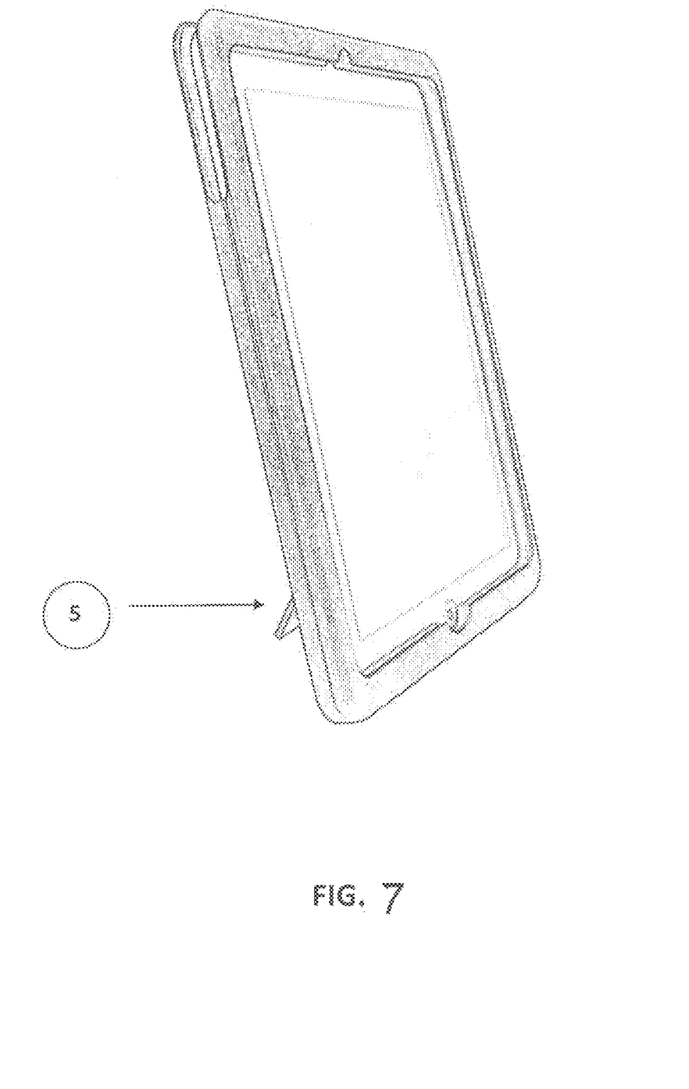
FIG. 7 is another perspective view of the case according to an embodiment.

FIG. 7 is a perspective view of case 100 holding a mobile device 102 and with pullout stand 204 in an extended position in order to display the mobile device at an angle. In FIG. 7, case 100 is in a portrait position wherein the height is greater than the length.

Figure 8:
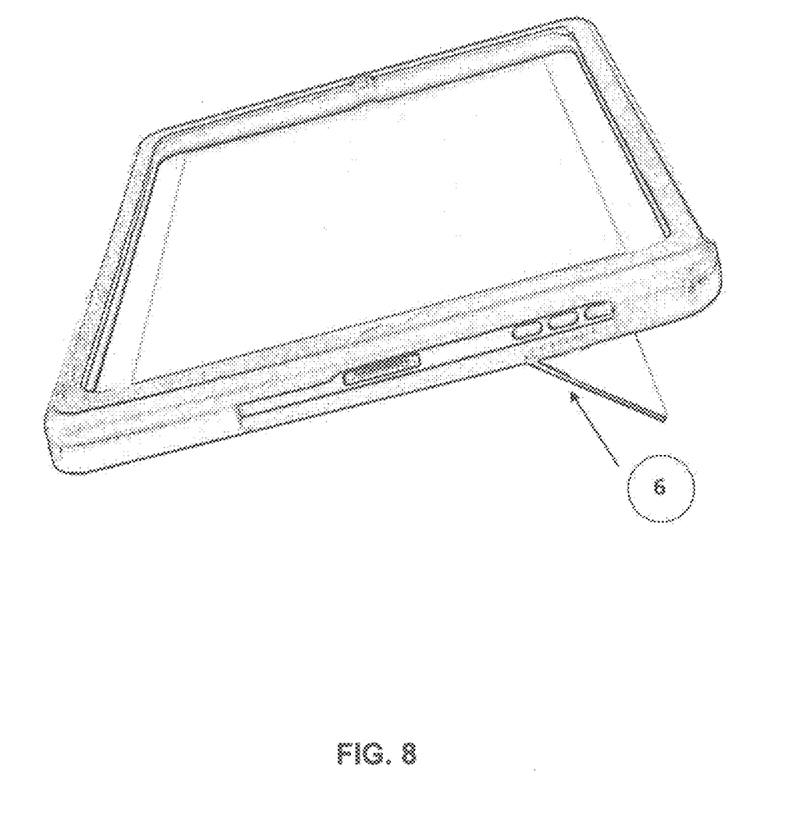
FIG. 8 is another perspective view of the case according to an embodiment.

FIG. 8 is a perspective view of case 100 holding a mobile device 102 and with the pullout stand 204 in an extended position in order to display mobile device at another angle. The FIG. 8 extended position is also referred to as a typing configuration or typing position. In particular, in this position support leg 410 transfers the weight of mobile device 102 to pullout stand 204. The angle formed by case 100 with respect to the supporting surface in FIG. 8, i.e., the typing position, is twenty degrees (20°). In at least some embodiments, the typing position provides a stable typing surface with at least three points of support.

In contrast, in FIGS. 6 and 7, clip 502 acts to retain pullout stand 204 in position and causing case 100 to form the predetermined angle with respect to the surface on which the case rests. In at least some embodiments, the predetermined angle is between about 65° and 75°. In at least one embodiment, the predetermined angle is 70°.

Figure 9:
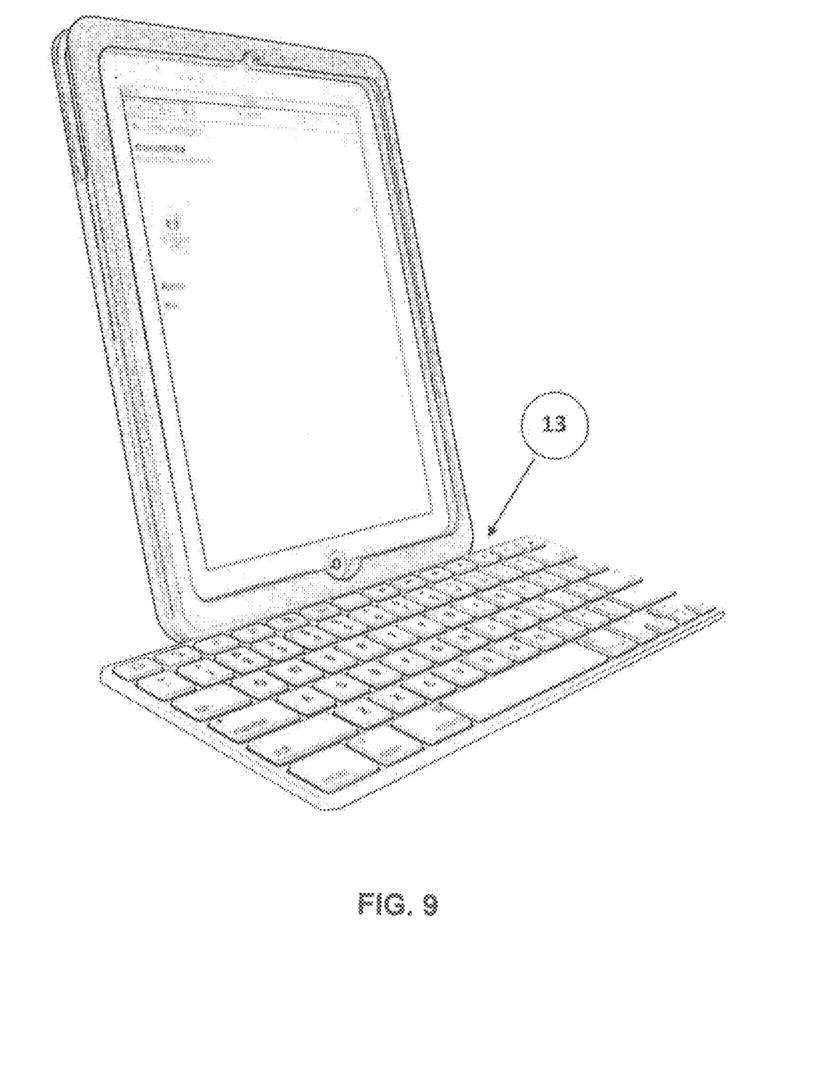
FIG. 9 is a perspective view of the case according to an embodiment and wherein the mobile device is connected to a keyboard according to another embodiment.

FIG. 9 is a perspective view of case 100 retaining mobile device 102 in a vertical position with pullout stand 204 retracted. Mobile device 102 is connected with a keyboard via an opening in the base of case 100.

In at least some embodiments, a screen on a face of mobile device 102 is viewable through an opening in case 100 with the mobile device positioned within the case. In use, mobile device 102 may be removed from case 100, e.g., in at least one embodiment by unsnapping snap closure 414 and sliding the mobile device out, flipped over (rotated 180° along either the horizontal or vertical axis) and inserted back into the case. In this manner, the screen of mobile device 102 is protected from contact external to case 100. For example, the screen is protected from damage caused by case 100 being in a briefcase or other containers.

One or more embodiments of the present invention comprise a swivel handle due to the mounting of the handle on the rotatable platform (also referred to as a base). Because of the resilient (or elastic) strap, the swivel handle stretches out to allow sufficient space for a user's hand or another appendage. The elastic straps operate to pull the handle back in place after removal of the hand. The rotatable (or swivel) platform (or base) has a low profile and enables 360° rotation. Thus, pullout stand 204 and the handle may be positioned at any point in the 360° rotation. The pullout stand (also referred to as a retractable stand) extends from the platform 200 and locks at a predetermined angle via clip 502. The predetermined angle is formed by an inward folding of a portion of the pullout stand to contact platform 200.

Figure 10:
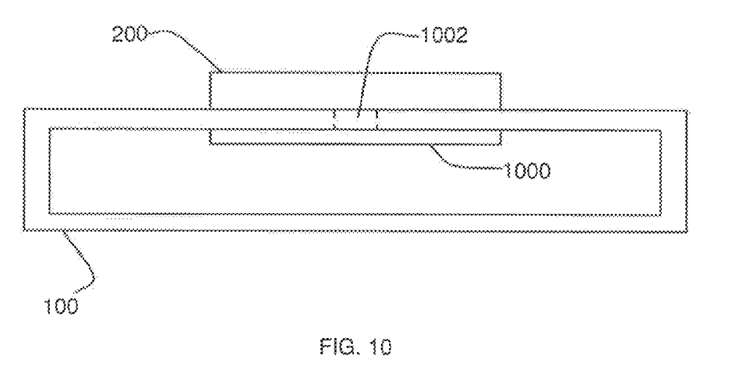
FIG. 10 is a side schematic view of a mounting mechanism for attaching the platform to the case according to an embodiment.

FIG. 10 is a side schematic view of a mounting mechanism for attaching platform 200 to case 100 according to an embodiment. A flat member 1000 is positioned interior to case 100 and connected via a pin (or connecting member) 1002 to platform 200. Pin 1002 extends through case 100 to enable rotation of platform 200.

Figure 11:
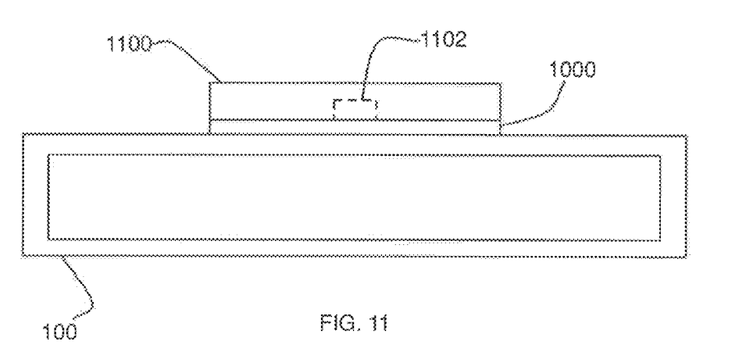
FIG. 11 is a side schematic view of a mounting mechanism for attaching the platform to the case or device according to another embodiment.
Figure 12:
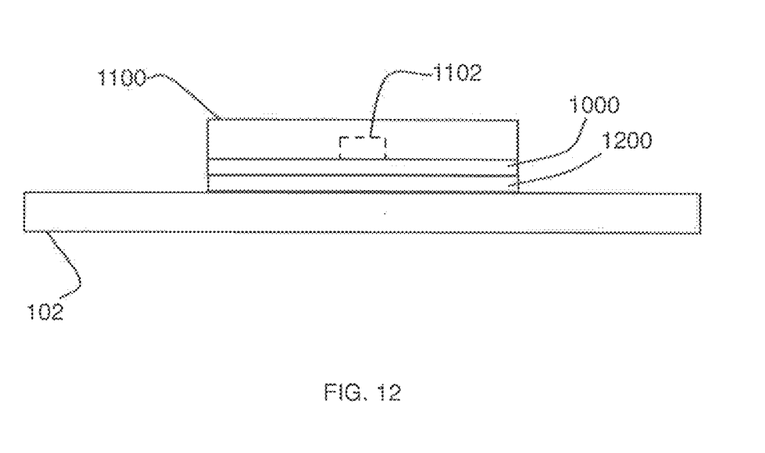
FIG. 12 is a side schematic view of a mounting mechanism for directly attaching the platform to the device according to another embodiment.

FIG. 11 is a side schematic view of a mounting mechanism for attaching a platform 1100, similar to platform 200, to case 100 according to another embodiment. FIG. 12 is a view of a platform 1100 attached directly to device 102. In accordance with such an embodiment, platform 1100 may be coupled via an adhesive backed hook and/loop fastening material 1200.

Flat member 1000 is positioned exterior to and attached with case 100 and connected via a pin (or connecting member) 1102 to platform 200. Pin 1102 extends through case 100 to enable rotation of platform 1100. In the FIG. 11 embodiment, pin 1102 does not extend through case 100. Additionally, member 1000 is attached to case 100 via adhesive, hook and loop fastener, or other permanent, semi-permanent, or releasable attachment mechanism. In at least some further embodiments, flat member 1000 is optional and pin 1102 is directly attached with an exterior face of case 100.

It will be readily seen by one of ordinary skill in the art that the disclosed embodiments fulfill one or more of the advantages set forth above. After reading the foregoing specification, one of ordinary skill will be able to affect various changes, substitutions of equivalents and various other embodiments as broadly disclosed herein. It is therefore intended that the protection granted hereon be limited only by the definition contained in the appended claims and equivalents thereof.

What is claimed is:

1. A case assembly for holding a mobile device, the case assembly comprising:
    a case defining an interior compartment configured to retain the mobile device therein;
    a rotatable platform connected with the case;
    a hand-strap connected with the platform at opposite edges of a periphery of the platform and configured to be held by a user;
    a pullout stand connected with the platform, the pullout stand being retained by the platform so that a part of the pullout stand is maintained within the platform between the opposite edges of the periphery of the platform; and
    wherein an entirety of the pullout stand is arranged to move in a direction co-planar with a face of the platform.

2. The case assembly of claim 1, wherein the hand-strap comprises a resilient strap extending around a portion of the rotatable platform.

3. The case assembly of claim 2, wherein the resilient strap comprises a pair of ends having complementary hook and loop fasteners attached thereto.

4. The case assembly of claim 1, the case assembly further comprising a flexible handle connected with the hand-strap.

5. The case assembly of claim 4, wherein the hand-strap extends through the flexible handle and is arranged to have an adjustable length.

6. The case assembly of claim 1, wherein the pullout stand is slideably attached to the rotatable platform.

7. The case assembly of claim 1, wherein the pullout stand comprises a first planar portion hingedly connected to a second planar portion, the second planar portion extending substantially within the rotatable platform, the first portion being arranged to extend outside the rotatable platform when the pullout stand is extended.

8. The case assembly of claim 1, wherein at least a portion of the pullout stand extends below the hand-strap when the pullout stand is not extended.

9. The case assembly of claim 1, wherein the pullout stand comprises a support leg hingedly connected to the pullout stand.

10. The case assembly of claim 9, wherein the support leg is a cut out portion of the pullout stand and is co-planar with the pullout stand when the pullout stand is not extended.

11. The case assembly of claim 9, wherein the support leg is arranged to be inserted into a face of the rotatable platform and is perpendicular to the face of the rotatable platform when inserted.

12. The case assembly of claim 11, wherein the support leg comprises a slit arranged to receive a portion of the rotatable platform therein and engage the rotatable platform.

13. The case assembly of claim 11, wherein the rotatable platform is rotatable when the support leg is inserted into the face of the rotatable platform.

14. The case assembly of claim 1, wherein at least one face of the case defines an opening to the exterior of the case for viewing a screen of the mobile device therethrough.

15. The case assembly of claim 14, wherein the case interior is configured to retain the mobile device positioned such that the screen of the mobile device is facing away from the opening to the exterior of the case.

16. The case assembly of claim 1, wherein the platform is rotatable 360° with respect to the case.

17. A method of use of a case assembly for a mobile device, wherein the case assembly comprises a case that defines an interior compartment for receiving the mobile device therein, at least one face of the case defines an opening to the exterior of the case for viewing a screen of an inserted mobile device therethrough, a rotatable platform connected with the case, a hand-strap connected with the platform at opposite edges of a periphery of the platform for being held by a user, and a pullout stand connected with the platform, the pullout stand being retained by the platform so that a part of the pullout stand is maintained within the platform between the opposite edges of the periphery of the platform, wherein an entirety of the pullout stand is arranged to move in a direction co-planar with a face of the platform, the method comprising:
    receiving a mobile device into the interior compartment such that the screen faces away from the opening to the exterior of the case;
    removing the mobile device from the interior compartment; and
    rotating and reinserting the mobile device into the interior compartment such that the screen faces toward the opening to the exterior of the case.

18. The method of claim 17, wherein the rotating comprises a 180° rotation of the mobile device.

19. The method of claim 17, further comprising:
    rotating the case with respect to the rotatable platform through an angle of about 360°.

20. The method of claim 17, further comprising:
    rotating the case with respect to the rotatable platform through an angle of less than 360°.

\* \* \* \* \*